US010026340B2

(12) United States Patent
Salazar Ruiz et al.

(10) Patent No.: US 10,026,340 B2
(45) Date of Patent: Jul. 17, 2018

(54) METHOD OF DETECTION AND REMOVAL OF AUXILIARY MATERIAL SUITABLE FOR THE MANUFACTURING OF AN AIRCRAFT ELEMENT

(71) Applicant: AIRBUS OPERATIONS S.L., Getafe (ES)

(72) Inventors: Adrián Salazar Ruiz, Toledo (ES); Óscar Macías Martín-Crespo, Toledo (ES); Jesús López Coracho, Toledo (ES); Abraham Pérez Nuevo, Toledo (ES); Nuria Martínez Martín, Toledo (ES)

(73) Assignee: AIRBUS OPERATIONS S.L., Madrid (ES)

( * ) Notice: Subject to any disclaimer, the term of this patent is extended or adjusted under 35 U.S.C. 154(b) by 0 days.

(21) Appl. No.: 14/475,001

(22) Filed: Sep. 2, 2014

(65) Prior Publication Data

US 2015/0059938 A1  Mar. 5, 2015

(30) Foreign Application Priority Data

Sep. 4, 2013 (EP) ..................... 13382344

(51) Int. Cl.
| | | |
|---|---|---|
| B32B 43/00 | (2006.01) | |
| B64F 5/00 | (2017.01) | |
| B65D 65/22 | (2006.01) | |
| G09F 3/02 | (2006.01) | |
| G09F 3/00 | (2006.01) | |
| B64F 5/10 | (2017.01) | |

(52) U.S. Cl.
CPC .......... *G09F 3/0297* (2013.01); *B32B 43/006* (2013.01); *B64F 5/10* (2017.01); *B65D 65/22* (2013.01); *B32B 2307/208* (2013.01); *B32B 2309/72* (2013.01); *B32B 2605/18* (2013.01); *Y10T 29/49622* (2015.01); *Y10T 29/49627* (2015.01); *Y10T 156/1105* (2015.01)

(58) Field of Classification Search
CPC ........ Y10T 29/49622; Y10T 29/49627; Y10T 156/1105; G09F 3/0297; B64F 5/0009; B65D 65/22; B32B 43/006; B32B 2605/18; B32B 2307/208; B32B 2309/72
USPC .................. 29/897.2, 897.213; 150/154, 157
See application file for complete search history.

(56) References Cited

U.S. PATENT DOCUMENTS

| | | | | |
|---|---|---|---|---|
| 4,510,489 A | * | 4/1985 | Anderson, III ........ | G01V 15/00 148/304 |
| 5,111,186 A | * | 5/1992 | Narlow ................ | G08B 13/242 340/572.5 |
| 5,313,192 A | * | 5/1994 | Ho ......................... | G01V 15/00 148/108 |
| 5,357,240 A | * | 10/1994 | Sanford ............. | G08B 13/2408 206/818 |
| 7,744,033 B2 | * | 6/2010 | Gonzalez Linero ..... | B64D 9/00 244/118.1 |
| 7,861,835 B2 | * | 1/2011 | Montross .................. | G09F 3/08 190/101 |
| 8,269,633 B2 | * | 9/2012 | Hollander .......... | G06K 19/0716 340/539.26 |
| 8,312,906 B2 | * | 11/2012 | Brandt .................. | B64F 5/0009 156/379.8 |
| 9,058,554 B2 | * | 6/2015 | Kervinen ............. | G06K 19/027 |
| 2005/0242962 A1 | * | 11/2005 | Lind .................... | G06K 19/073 340/572.8 |
| 2007/0284481 A1 | * | 12/2007 | Linero ..................... | B64D 9/00 244/137.1 |
| 2008/0136647 A1 | * | 6/2008 | Brown ............... | G08B 13/2482 340/572.8 |
| 2009/0194210 A1 | * | 8/2009 | Montross ............... | A45C 13/30 150/154 |
| 2009/0237211 A1 | * | 9/2009 | Connell .................. | G06K 19/04 340/10.1 |
| 2010/0038024 A1 | * | 2/2010 | Brandt .................. | B64F 5/0009 156/249 |
| 2010/0141456 A1 | * | 6/2010 | Hollander .......... | G06K 19/0716 340/572.8 |
| 2010/0314277 A1 | * | 12/2010 | Murray .............. | B65D 73/0014 206/461 |
| 2012/0278676 A1 | * | 11/2012 | Teraura ............... | G06F 11/1489 714/746 |
| 2012/0298758 A1 | * | 11/2012 | Vishwanath ....... | G06K 19/0773 235/492 |

(Continued)

FOREIGN PATENT DOCUMENTS

| | | |
|---|---|---|
| DE | 3715928 | 7/1988 |
| DE | 10336721 | 3/2005 |
| DE | 10336721 A1 * | 3/2005 ........... A45C 13/002 |

OTHER PUBLICATIONS

DE 10336721 English Machine Translation; Anastasia Milona; dated Dec. 29, 2015, pp. 1-4.*
European Search Report dated Jan. 31, 2014.

*Primary Examiner* — Bayan Salone
(74) *Attorney, Agent, or Firm* — Dickinson Wright PLLC

(57) ABSTRACT

A method of detection and removal of auxiliary material suitable for the manufacturing of an aircraft element includes providing an auxiliary material having at least one detection label, scanning the element with a label detector suitable to detect the detection label once the element has been manufactured, detecting the auxiliary material by means of a warning signal emitted by the label detector and removing the auxiliary material from the element. An auxiliary material suitable for the manufacturing of an aircraft element includes a detection label.

8 Claims, No Drawings

(56) References Cited

U.S. PATENT DOCUMENTS

2014/0286700 A1\* 9/2014 Tiryaki .................... B64C 1/00
  403/282
2015/0317896 A1\* 11/2015 Planton .............. G06K 19/0717
  340/584

\* cited by examiner

METHOD OF DETECTION AND REMOVAL OF AUXILIARY MATERIAL SUITABLE FOR THE MANUFACTURING OF AN AIRCRAFT ELEMENT

CROSS REFERENCE TO RELATED APPLICATION

This application is entitled to and claims the benefit of European Application No. EP13382344.3 filed Sep. 4, 2013, the disclosure of which, including the specification, claims and abstract, is incorporated herein by reference in their entirety.

OBJECT OF THE INVENTION

The present invention belongs to the field of aircraft structures and relates to a method of detection and removal of auxiliary material suitable for the manufacturing of an aircraft element.

RELATED ART

Certain steps of the manufacturing process of some elements of an aircraft need the use of auxiliary materials, such as protective plastic foils or films used to cover aircraft parts during the handling and manufacturing of an aircraft element, such as a wing. Before assembling a particular part of the aircraft element to the rest of the structure conforming the aircraft element, the auxiliary material has to be removed. Otherwise, intrusive materials would remain inside the final configuration of the aircraft element, thus leading to possible problems in structural behaviour when attaching these aircraft elements to other ones, as auxiliary materials do not behave in the same way as the material of the aircraft elements covered by them. There could also be other problems, like electrical conduction discontinuity or differences in thermal expansion between the aircraft elements and the auxiliary materials, as well as different behaviour when making holes, causing the intrusion of rests of auxiliary material into the joining means of different aircraft elements. In these cases, said auxiliary material should be removed, but as it has been somehow processed together with the aircraft element, said removal would involve a major repair.

Once the aircraft element is finished, it is complicated and therefore expensive to remove the auxiliary material in order to remedy the error. The repair of this kind of defects involves many hours and resources spent.

Up to date, there is no robust process to avoid the intrusion of material (FOD) coming from auxiliary materials or films and there is no technology that helps to avoid the problem.

SUMMARY OF THE INVENTION

Advantageously, the present invention overcomes the above problems by the provision of a method according to attached claims, a method of manufacturing an aircraft wing according to attached claims and an auxiliary material according to attached claims. The dependent claims define preferred embodiments of the invention.

In a first inventive aspect, the present invention relates to a method of detection and removal of auxiliary material suitable for the manufacturing of an aircraft element, the method comprising the following steps:

supplying the auxiliary material with at least one detection label, once the element has been manufactured, scanning the element with a label detector suitable to detect the detection label, detecting the auxiliary material by means of a warning signal emitted by the label detector, removing the auxiliary material from the element.

With the method of the invention, the presence of an auxiliary material can be easily detected by the warning signal emitted by the detector before advancing to the next step of a manufacturing process, thus preventing in a simple and cost effective way the presence of auxiliary materials in subsequent steps of the process.

In a preferred embodiment the element is an aircraft reinforcement. In a preferred embodiment, it is a stringer or a rib or a spar.

In a preferred embodiment the label is a magnetic label or an acousto-magnetic label. Advantageously, acousto-magnetic labels are easily applicable over flat surfaces and provide a strong and reliable adhesion. They also resist a fairly wide range of temperatures (approximately from −36° C. to 70° C.).

In a preferred embodiment the warning signal emitted by the label detector is an acoustic signal and/or a visual signal.

In a second inventive aspect the invention relates to a method of manufacturing an aircraft, comprising the step of manufacturing at least an aircraft element, wherein the step of manufacturing said aircraft element comprises the method of detection and removal of auxiliary material according to the first inventive aspect.

In a third inventive aspect the invention relates to an auxiliary material suitable for the manufacturing of an aircraft element comprising a detection label.

All the features described in this specification (including the claims, description and drawings) and/or all the steps of the described method can be combined in any combination, with the exception of combinations of such mutually exclusive features and/or steps.

DETAILED DESCRIPTION

In certain steps of the manufacturing process of elements of an aircraft, auxiliary materials, e.g. in the form of plastic films, are used to cover aircraft parts during the handling and manufacturing of the aircraft element. For example, wing reinforcements are manufactured using the Automatic Tape Layer technology. During the manufacture process of the wing, an auxiliary material is placed covering wing reinforcement parts for protecting them during the cutting process of said wing reinforcement parts. The reinforcement is then assembled to the rest of parts forming the wing.

The manufacturing process of many elements of an aircraft is mostly manually made, as in the case of the wing. As a consequence of that, the operators must be deeply focused on the process of controlling the removal of auxiliary material when this material is no longer necessary.

According to the invention, the auxiliary material to be used during the manufacturing process of an aircraft wing is provided with at least one detection label. When a wing reinforcement such as a stringer or a spar is manufactured, it is scanned with a label detector suitable to detect the detection label. If auxiliary materials are present in the manufactured reinforcement, they are detected by means of a warning signal emitted by the label detector. The warning signal emitted by the detector is preferably an acoustic signal and/or a visual signal, although other options are also possible. Finally, the auxiliary materials covering the reinforcement are removed from the reinforcement, before assembling the reinforcement to other parts of the aircraft wing.

Since every auxiliary material covering a part of the reinforcement is provided with a detection label, the presence of auxiliary material in the manufactured reinforcement is easily and quickly detected by scanning with the label detector, thus assuring that no auxiliary material is present at a later stage of the manufacturing process of the aircraft wing.

In a preferred embodiment the detection label is an acousto-magnetic label. These labels comprise at least two metal strips free to oscillate mechanically under an excitation caused by a corresponding detector, which detector in turn detects the label vibration.

According to the invention, a method of manufacturing an aircraft wing which comprises a step of manufacturing at least one wing reinforcement comprises supplying an auxiliary material with at least one detection label and covering at least part of the wing reinforcement with the auxiliary material. Once the reinforcement has been manufactured, it is scanned with a label detector suitable to detect the detection label. If an auxiliary material is detected by means of a warning signal emitted by the label detector, the auxiliary material is removed from the reinforcement, before the assembly of the reinforcement to the other parts of the wing.

Although the described example refers to a wing reinforcement, the method of the invention is applicable to any element for the manufacture of which an auxiliary material is used.

The invention claimed is:

1. A method of detection and removal of auxiliary material suitable for the manufacturing of an aircraft element, the method comprising the following steps:

providing an auxiliary material having at least one detection label, covering at least part of the aircraft element with the auxiliary material, scanning the element with a label detector suitable to detect the detection label, detecting the auxiliary material by means of a warning signal emitted by the label detector, and removing the auxiliary material from the element, wherein the label is an acousto-magnetic label that undergoes vibration in response to an excitation caused by the label detector, and said label vibration is detected by the label detector, and the warning signal emitted by the label detector is an acoustic signal and/or a visual signal.

2. The method according to claim 1, further comprising the step of placing the detection label on the auxiliary material, prior to providing the auxiliary material.

3. The method according to claim 1, wherein the element is a reinforcement.

4. The method according to claim 3, wherein the reinforcement is a stringer or a spar or a rib or a frame.

5. A method of manufacturing an aircraft wing, comprising manufacturing at least an aircraft element, wherein the step of manufacturing the aircraft element comprises detection and removal of auxiliary material according to claim 1.

6. An auxiliary material suitable for covering aircraft parts during their handling or manufacturing comprising an acousto-magnetic detection label structured to vibrate and enable detection by scanning with a label detector.

7. The auxiliary material according to claim 6, wherein the auxiliary material is a plastic film.

8. The method according to claim 1, wherein the scanning of the element with a label detector suitable to detect the detection label is performed after the element has been manufactured.

* * * * *